W. G. DUNN.
Railroad Rail-Joint.

No. 196,569        Patented Oct. 30, 1877.

Witnesses:
P. T. Madison
L. P. Harlan

Inventor.
William G. Dunn
per C. Bradford
Attorney.

UNITED STATES PATENT OFFICE.

WILLIAM G. DUNN, OF FAIRLAND, INDIANA.

IMPROVEMENT IN RAILROAD-RAIL JOINTS.

Specification forming part of Letters Patent No. 196,569, dated October 30, 1877; application filed July 17, 1876.

*To all whom it may concern:*

Be it known that I, WILLIAM G. DUNN, of the town of Fairland, county of Shelby, and State of Indiana, have invented certain new and useful Improvements in Railroad - Rail Joints, of which the following is a specification:

Reference is had to the accompanying drawings, which are made a part hereof, and on which similar letters of reference indicate similar parts.

Figure 1:
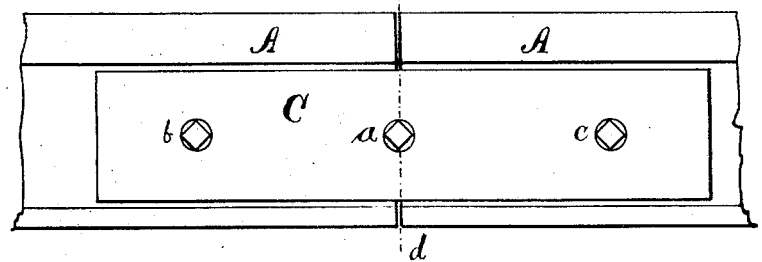
Figure 2:
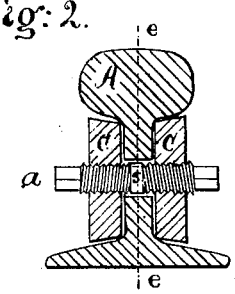
Figure 3:
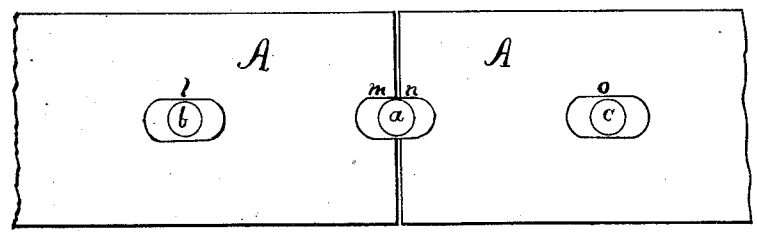

Figure 1 is a side view of sufficient of two adjoining rails to illustrate my invention. Fig. 2 is a transverse section on the dotted lines $d\ d$, Fig. 1. Fig. 3 is a longitudinal section on the dotted line $e\ e$, Fig. 2.

The object of my invention is to provide a means whereby the ends of railroad-rails may be held firmly together, and the vibrating motion usual to the old styles of joints prevented. This is accomplished by the combination of bolts and bars or plates, hereinafter shown and described.

In the drawings, A A represent ends of ordinary railroad-rails; C C, plates or bars, which cross the joint where the rails A A meet; and $a\ b\ c$, screw-bolts used to fasten the plates C C to the rails A A. I do not, however, limit myself to any specific number of bolts to be used in this connection. In the rails are holes $l\ m\ n\ o$ for the reception of the bolts $a\ b\ c$. The threads on the bolts are right-hand threads at one end of each, and a left-hand thread on the other end. One of each pair of the plates C C has its bolt-holes provided with a right-hand screw-thread, and the other with a left-hand screw-thread, in order that they may fit the bolts, so that the bolts may bring up both of the plates simultaneously, and a perfectly-fitting union of all the parts be effected.

In applying my invention, the rails A A are placed end to end in the usual manner. The bolts $a\ b\ c$ are placed in the holes or slots $l\ m\ n\ o$, and the plates C C are placed on both ends of said bolts. The bolts are then all simultaneously turned in the same direction, and when the plates C C are thereby brought tightly up to the rail ends A A the fastening of the joint is complete.

The effect of this combination is, that all the bolts must be worked at once, rendering it impossible for the joints, when once properly put together, to come loose, as when one of the bolts commences to turn it immediately so tightens the others that further movement is impossible. If they move at all, all the bolts must move in unison.

The slot $m\ n$ is made partly in each rail, as shown, for the purpose of more firmly supporting the adjoining ends by means of the bolt $a$, and also by the same means to secure the plates C C more firmly at this point, and preventing the injurious play and vibrations, and the spreading of the ends in the injurious manner common to the old styles of joint. This arrangement destroys as nearly as possible all vibration of the joint, either lateral or vertical, and leaves it, in effect, practically rigid. It is also much cheaper than any joint I have heretofore seen, being constructed ordinarily with two plain flat bars, and only three bolts, which are made without either heads or nuts, thus giving, considering the large number used, a very important saving in cost over the ordinary joint. A further improvement is the central collar $s$, which prevents battering the screw-threads.

The importance of these results will be readily seen by those who are familiar with railroads.

Having thus fully described my invention, what I claim as new, and desire to secure by Letters Patent, is—

The combination of the rails having notched ends, the flat plates C C, and right and left threaded bolt $a$, having an enlargement, $s$, as set forth.

In testimony that I claim the foregoing I have hereunto set my hand this 5th day of July, 1876.

WM. G. DUNN.

Witnesses:
W. L. SMITH,
THOS. H. SELMAN.